Sept. 25, 1951     J. G. WHITING     2,568,782
LIGHT PROJECTOR
Filed Feb. 1, 1947     5 Sheets-Sheet 1
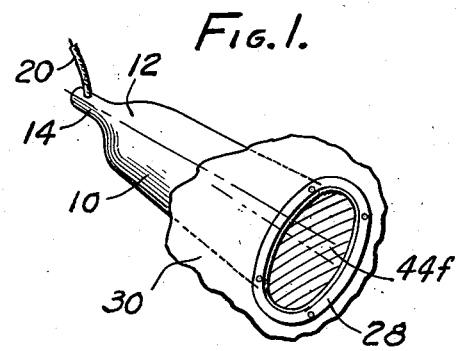
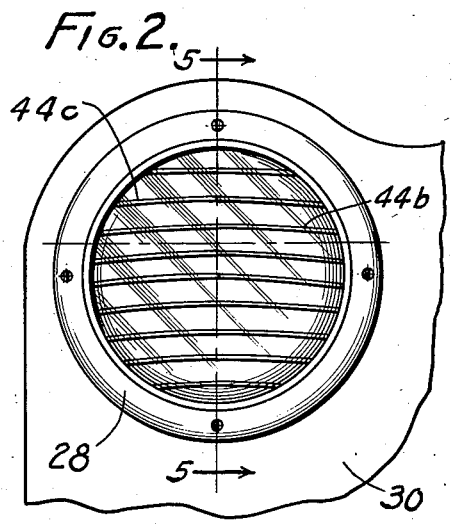
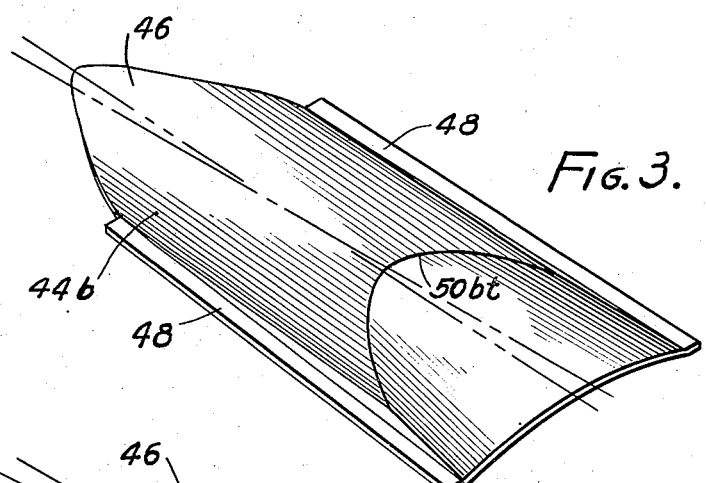
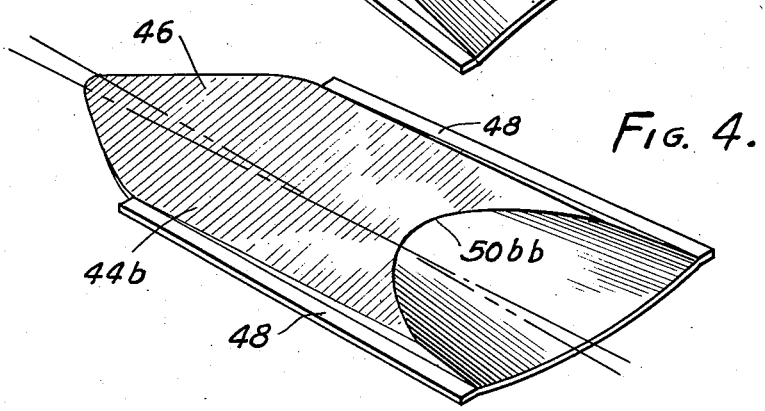
INVENTOR.
John G. Whiting
BY Moore, Olson & Trexler
Attys.

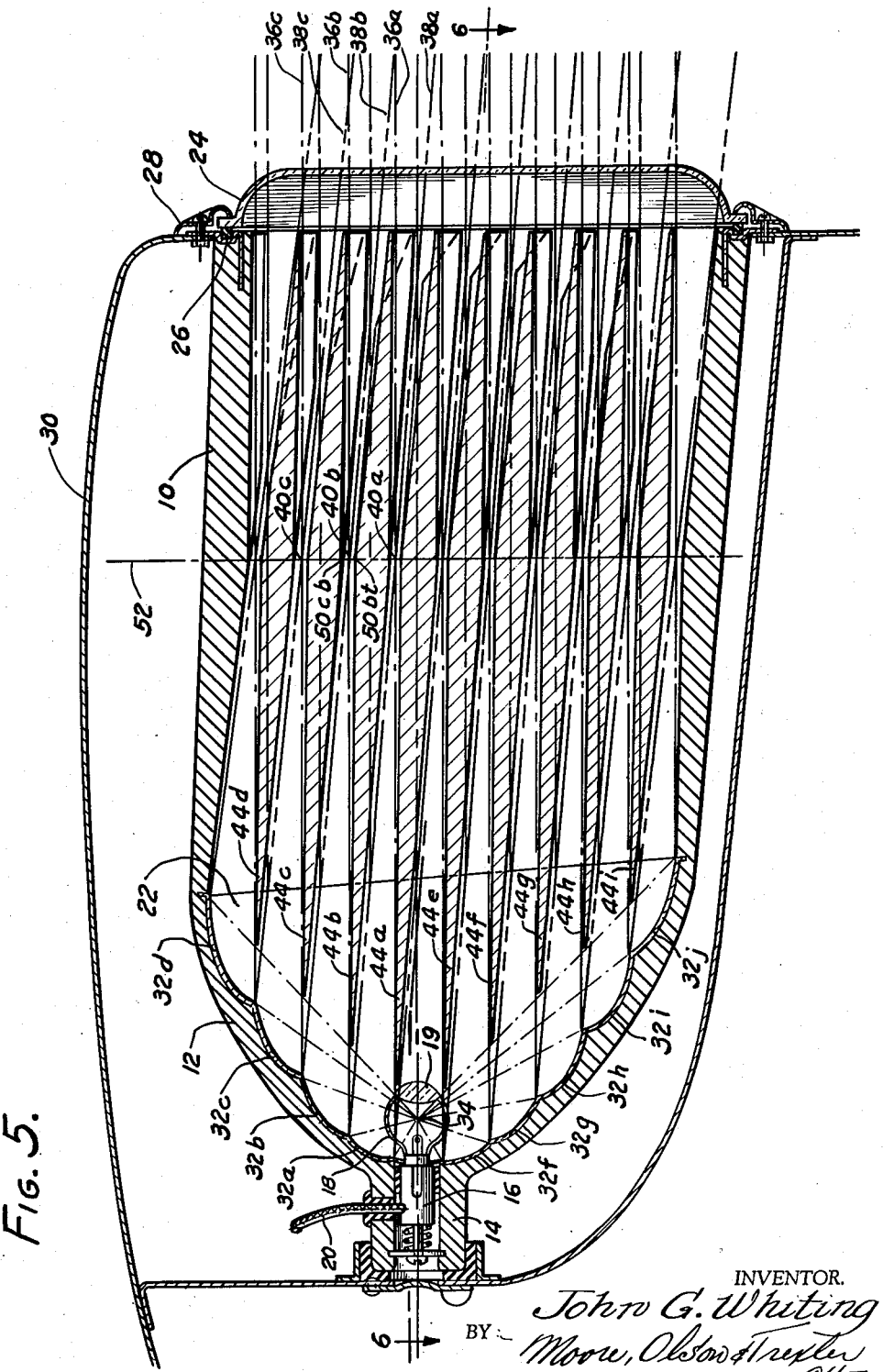

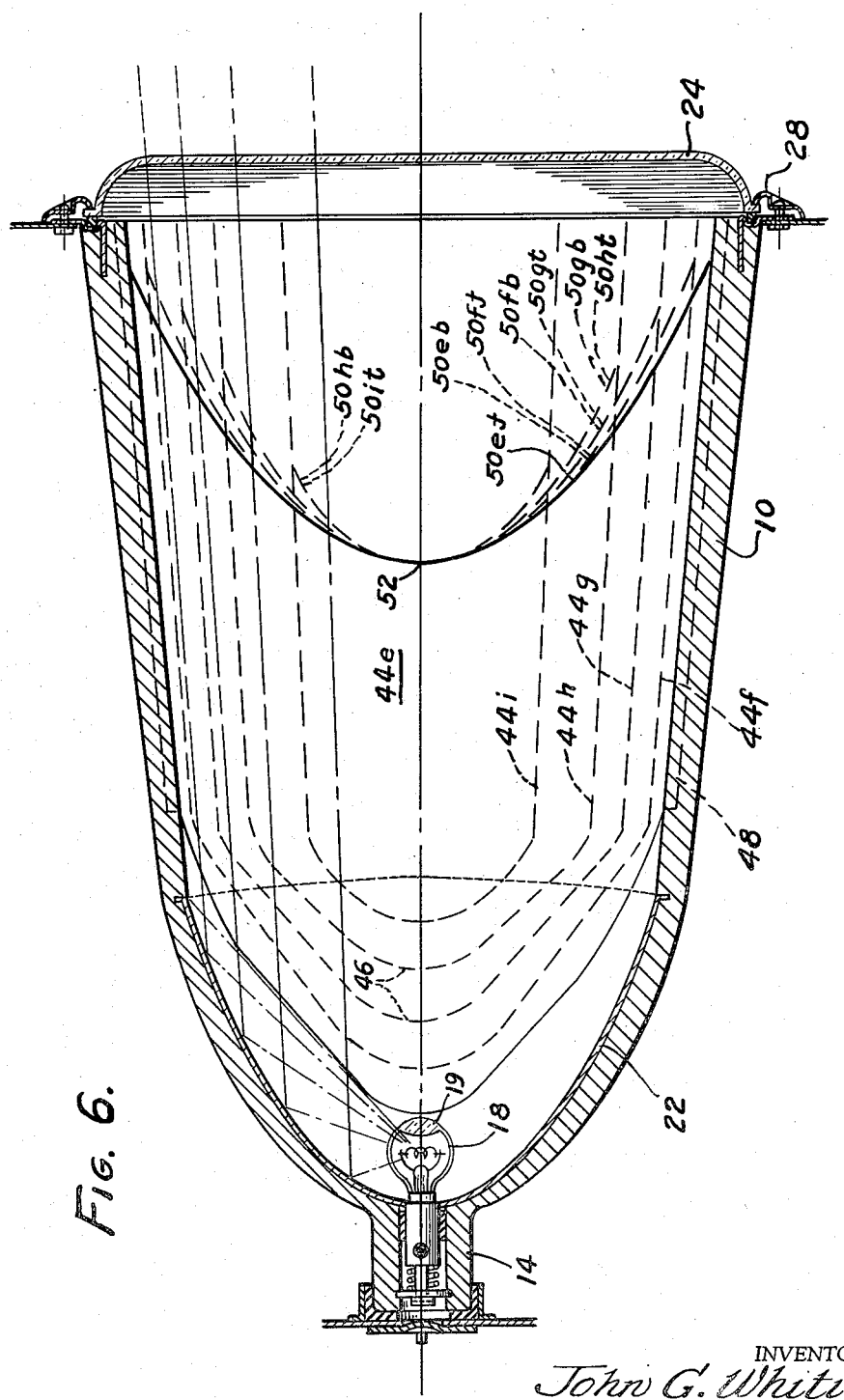

Sept. 25, 1951     J. G. WHITING     2,568,782
LIGHT PROJECTOR
Filed Feb. 1, 1947     5 Sheets-Sheet 4
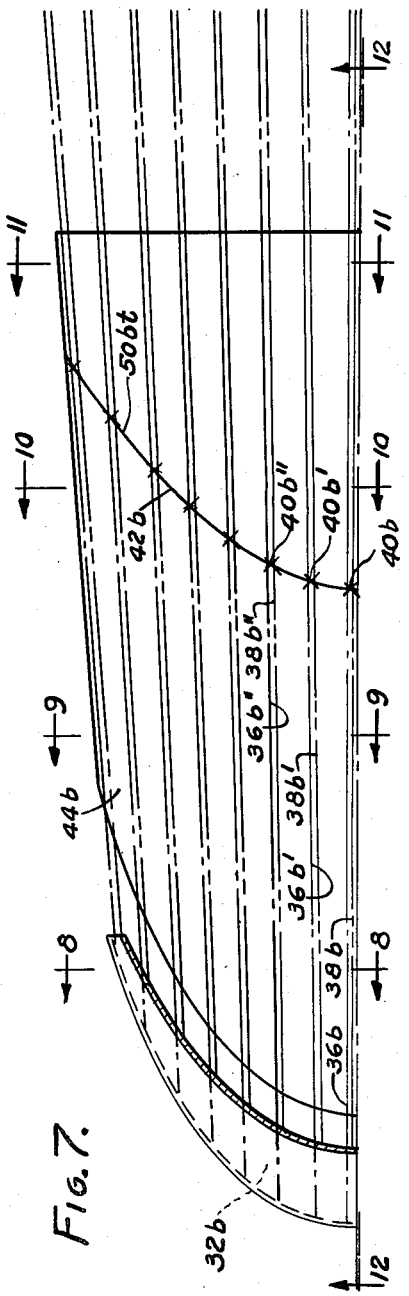
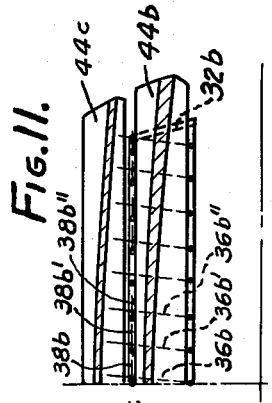
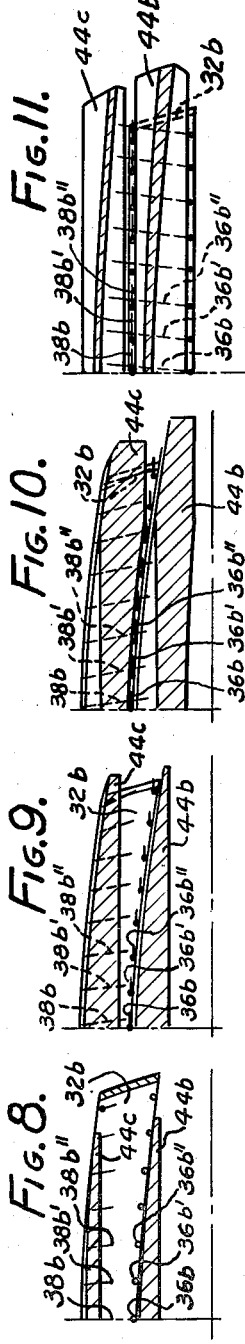
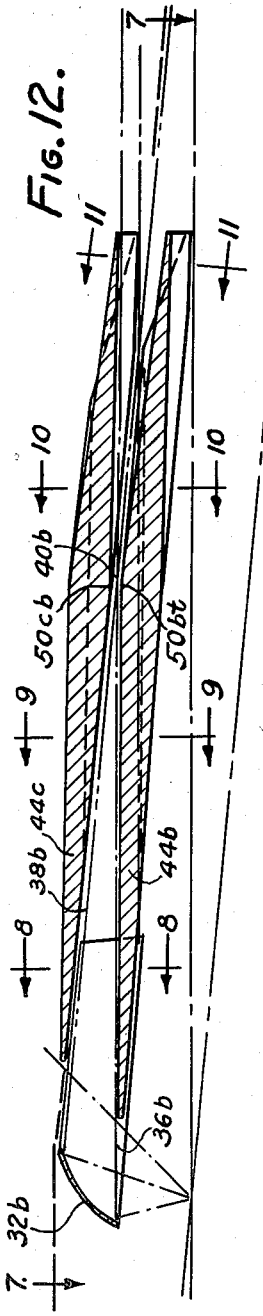
INVENTOR.
John G. Whiting
BY Moore, Olson & Trexler
attys.

Sept. 25, 1951  J. G. WHITING  2,568,782
LIGHT PROJECTOR
Filed Feb. 1, 1947  5 Sheets-Sheet 5
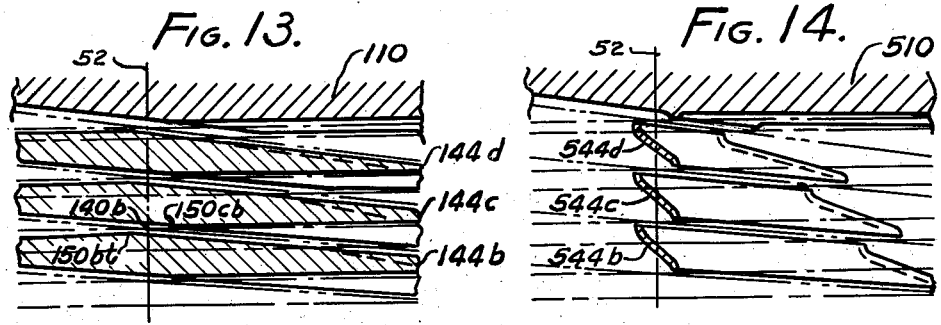
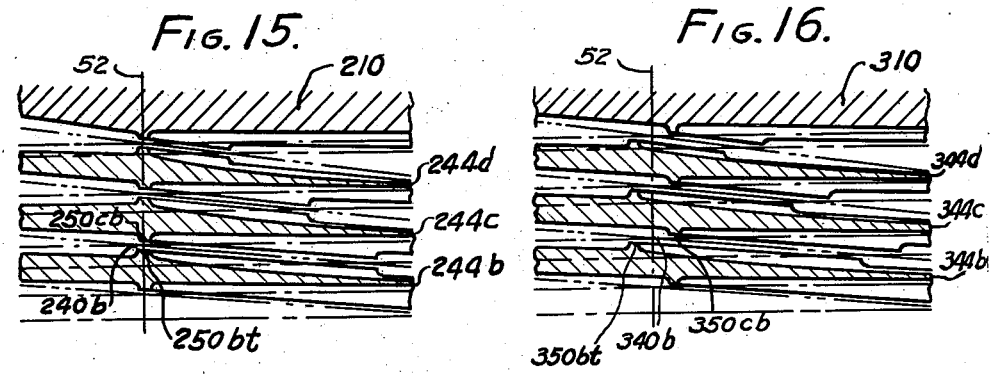
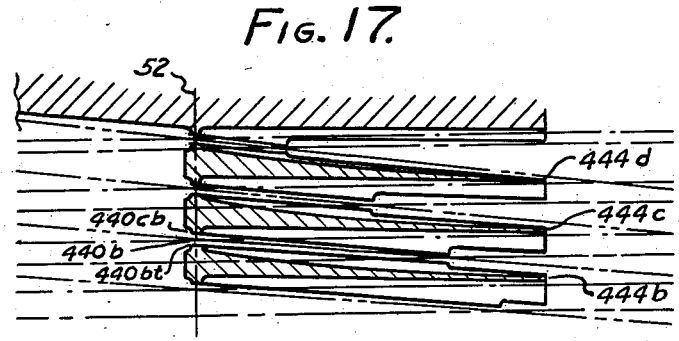
INVENTOR.
John G. Whiting Patented Sept. 25, 1951

2,568,782

UNITED STATES PATENT OFFICE 2,568,782

LIGHT PROJECTOR

John G. Whiting, Chicago, Ill.

Application February 1, 1947, Serial No. 725,942

14 Claims. (Cl. 240—41.36)

This invention relates to light projectors, and to means and methods for controlling and projecting light; and concerns particularly shielding means and methods for use in light projectors for controlling and directing the projected light pattern.

It is an object of the invention to provide a light projector, and associated shielding means, of improved construction and improved operating characteristics.

More specifically stated, it is an object of the invention to provide a light projector structure, having a light reflector and associated shielding means, arranged in an improved manner to provide a projector of minimized glare and maximum efficiency in respect to the power and magnitude of the light source.

A still further object of the invention is to provide in a light projector of the foregoing type, an improved arrangement of shielding means and improved shielding structures, for controlling the projected light pattern.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Fig. 1 is a general assembly view, in perspective, of a light projector, constructed in accordance with and embodying the principles of the invention;

Fig. 2 is a front view of the structure of Fig. 1, on an enlarged scale;

Fig. 3 is an enlarged top perspective view of one of the baffles or shields, as utilized in the structure of Fig. 1, and particularly related to the subject matter of the present invention;

Fig. 4 is a bottom perspective view of the shielding element shown in Fig. 3;

Fig. 5 is a vertical, longitudinal sectional view through the projector, somewhat diagrammatic in form, and taken as indicated by the line 5—5 of Fig. 2;

Fig. 6 is a horizontal longitudinal sectional view through the projector taken as indicated by the line 6—6 of Fig. 5;

Fig. 7 is a detail illustrative plan view of a part of one of the reflecting areas of the reflector, and one associated shielding element, said view being taken as indicated by the line 7—7 of Fig. 12;

Figs. 8, 9, 10, and 11 are sectional illustrative views taken as indicated, respectively, by the lines 8—8, 9—9, 10—10 and 11—11 of Figs. 7 and 12, two shielding elements being shown; Figs. 8, 9 and 10 being taken on a plane normal to the horizontal axis of the reflector, and Fig. 11 being taken on a plane normal to the angle of the rays of maximum declination;

Fig. 12 is a vertical illustrative view of the reflector area of Fig. 7, with two associated shields, taken as indicated by the line 12—12 of Fig. 7; and Figs. 13, 14, 15, 16 and 17 are partial illustrative views, similar in character to a part of Fig. 5, illustrating modified structural embodiments.

This application is a continuation-in-part of my prior copending application entitled "Light Projector," Serial No. 488,159, filed May 24, 1943, and now issued as Patent No. 2,415,120, dated February 4, 1947.

The light projector herein shown, and subsequently to be specifically described, is of the general type and kind set forth and described in said prior copending application, the present invention providing improved shielding means for use in a projector of this type, to reduce glare, and provide increased efficiency. While the invention has been set forth for illustrative purposes, as in the prior case, as a light projector or headlight for vehicles, such as automobiles or the like; it is to be understood that the principles of the invention, and the light projector provided, are adapted for use as light projectors, generally, in installations of various types and kinds. In this connection, as will be understood, the projector may be used in various positions of inclination, or inverted, and the reflecting areas of the reflector, and the shielding means, may be variously arranged in accordance with the requirements of any particular installation and use. Vehicle headlights are conventionally disposed in generally horizontal position, and the lamp structure herein has been so illustrated, and it will be assumed, for purposes of illustration, that the longitudinal axis of the projector is horizontally disposed. In actual practice, however, it is common to tilt the head lamp axis downwardly a matter of 2° or 3° so as to project the light pattern more directly onto the road.

Referring more specifically to the drawings, and first to the embodiment illustrated in Figs. 1–12, it will be seen that the light projector or head lamp illustrated comprises an elongated casing 10, Figs. 1 and 5, of generally cylindrical form, open at its forward end, and closed at its rear end by a generally conically shaped portion 12. The conical end portion is provided with an extension 14 carrying an electric socket 16 arranged to receive a light bulb or lamp as indicated at 18, the lamp bulb being provided with a condensing lens 19, as shown. Electric current is supplied to the socket by means of a wire 20, or other suitable means.

The conical end portion 12 of the casing is arranged to receive a reflector 22, the casing being preferably formed to conform to the shaping of the reflector, and to conform to the pattern of the projected light rays, as shown.

The open end of the casing is closed by means of a glass plate 24 which may, for example, be clear glass in the particular embodiment disclosed, the flange of the plate being held against a sealing gasket 26 by means of a bezel ring 28, anchored to the frame structure 30 of the vehicle or other support with which the light projector is adapted to be associated.

The reflector 22 is shaped to provide a series of generally horizontally extending paraboloidal reflecting areas 32a, 32b, 32c, et cetera. These areas are individually concavely curved in vertical section, as shown in Fig. 5, and extend generally horizontally or transversely across the reflector. As more specifically pointed out in said companion application, these reflecting areas are so shaped as to project the rays from the filament 34 of the light source, which is at the focal point of the reflector, into a series of generally horizontal crossed ray light bands. Preferably, the rays reflected from the lowermost surfaces of each paraboloidal reflecting area, as indicated at 36a, 36b, 36c, et cetera, Fig. 5, are reflected in a horizontal direction, or parallel with the general longitudinal axis of the projector; whereas the rays reflected from the uppermost surfaces of each of the paraboloidal areas, as indicated at 38a, 38b, 38c, et cetera, will be reflected downwardly at a predetermined desired angle of declination. The rays reflected from the surfaces of each paraboloidal area between the lower and upper edges thereof, will be projected at uniformly varying angles between the limits defined, whereby to provide converging or crossed rays intersecting as indicated at 40a, 40b, 40c, et cetera.

While the reflecting areas 32a, 32b, 32c, et cetera, are generally horizontal, they are somewhat curved downwardly as they extend laterally from the center of the reflector, when viewed from the horizontal front as shown in Fig. 2; and so that they appear substantially flat or straight when the reflector is viewed from a position in front and below the horizontal, upwardly substantially at the angle of the rays of maximum declination. (See Fig. 11.)

Accordingly the horizontal rays reflected from any one paraboloidal area, for example as indicated at 36b, 36b', 36b'', et cetera, as viewed from the horizontal front of the reflector, Fig. 8, are at different vertical levels, the ray 36b at the center of the reflector being uppermost, as shown.

Similarly the uppermost rays from each paraboloidal area, for example as indicated at 38b, 38b', 38b'', et cetera, Fig. 8, are generated from different vertical levels, when considered in reference to the general horizontal axis of the projector. These rays of maximum declination, when viewed from a plane normal to the declination angle, as in Fig. 11, appear to lie in a straight line, or flat plane.

As also shown in Figs. 7–11, the rays from each paraboloidal area preferably are provided with a slight lateral spread, to provide the desired road pattern, each ray being of progressively increasing lateral deviation outwardly from the center of each deflecting area. In Fig. 7 each pair of rays 36b—38b, 36b'—38b', et cetera, are of necessity illustrated by parallel lines. However, each pair of rays, due to their projection at different vertical angles of declination, cross at respective points of intersection as indicated at 40b, 40b', 40b'', et cetera.

As more particularly pointed out in said companion application, the various points of intersection for the crossed rays of any one paraboloidal area define a parabolic line, as indicated at 42b, Fig. 7.

In said companion application the manner of generating the paraboloidal reflecting areas, and the determination of their size and extent in respect to the permissible size of the lamp and the focal point of the reflector are more particularly set forth. As is therein pointed out, the several paraboloidal areas may be considered to be developed so that each area is parabolic laterally, and so that the edges of the areas are in effect the lines of intersection between such parabolic reflecting surfaces and a series of inclined planes which are inclined at the angle of the rays of maximum declination from each area. The several parabolic surfaces or paraboloidal areas thus formed have a common focal point 34, but are of different parameter (disregarding the slight horizontal spread of the rays hereinbefore referred to). Two modified embodiments are illustrated, an embodiment being shown in Fig. 7 in said companion application wherein the rays of maximum declination are all declined at the same angle, and an embodiment being illustrated in Fig. 15 wherein the vertical size of each of the paraboloidal areas is substantially the same, resulting in a greater declination of the maximum declined rays at the upper and lower parts of the reflector when compared with the central reflector areas. In the instant case, for illustrative purposes, a structural embodiment corresponding to Fig. 15 of the companion application is set forth, viz., the several paraboloidal reflecting areas are of substantially equal vertical extent, as shown in Fig. 5, resulting in the rays of maximum declination being progressively declined at greater angles away from the central portion of the reflector. That is, the maximum declined rays 38b reflected from the area 32b have a slightly greater declined angle than the maximum declined rays 38a of the area 32a, et cetera.

In said companion application a plurality of shields or baffles is provided, in cooperation with the several paraboloidal reflecting areas, which are arranged to screen the rays emitted from the areas, and control the light pattern. While the shields provided in said application provide an effective screen, when the projector is viewed from the horizontal front, the shields are less effective when the projector is viewed from the front from a depressed angle, as for example upwardly at the angle of inclination of the declined rays.

In accordance with the present invention a more effective shielding means is provided, so as effectively to screen the reflecting areas when viewed from any position, without the sacrifice of lighting efficiency. In accordance with the present invention a series of shields or baffles is provided as indicated at 44, 44a, 44b, 44c, et cetera, Fig. 5, there being one shield provided for each of the horizontal reflecting areas. As best shown in Figs. 3 and 4, wherein the particular shield 44b is illustrated, each of the shields is provided with a tapered inner end 46 which projects a predetermined distance into the conical reflector. Each shield projects inwardly of the reflector a different distance, as shown in Figs. 5 and 6, so that the shields do not intercept any of the rays directed from the lamp source onto the reflector. The rays from the lamp which are projected between the shields 44a and 44e, Fig. 5, are collected and projected between the shields by the condensing lens 19. The shields may be conveniently mounted within the casing 10 by means of flanges 48, Fig. 3, provided thereon, engageable within suitably positioned slots in the sides of the casing 10.

In the embodiment of Figs. 1–12, each of the shields is of progressively increasing thickness from its inner end to a point coincident with that at which the light rays cross, and then of progressively decreasing thickness to the outer shield end. This point of maximum shield thickness which may, for convenience be herein referred to as the point of maximum control, lies along a parabolic line when considered horizontally of the shield, so as to coincide with the parabolic line of ray intersection as hereinbefore referred to, for example, as indicated at 42b in Fig. 7. This parabolic line of maximum shield thickness is indicated on the top of the shield 44b by the line 50bt in Fig. 3, and on the bottom of the shield by the line 50bb in Fig. 4.

As shown in Fig. 5, the points of intersection of the various rays from the center of each paraboloidal reflecting area lie along a vertical line 52, the point 52 also being indicated in Fig. 6. (This is true in the particular embodiment illustrated, wherein the several paraboloidal reflecting areas are of the same vertical extent as hereinbefore described; but would not otherwise be the case.) However, the parabolic line of intersection for the rays of each paraboloidal area, corresponding to the line 42b, Fig. 7, has a different parameter and thus a different shape, so that the outer ends of the various parabolic lines of ray intersection are not vertically coincident. Accordingly the maximum thickness line for the several shields will assume a correspondingly different shape, as indicated at 50et, 50ft, 50gt and 50ht in Fig. 6. However, the lower line of maximum shield thickness for each shield is vertically coincident with the upper line of maximum shield thickness for the next adjacent lower shield, the two maximum thickness points thus both being vertically coincident with the corresponding parabolic line defined by the associated crossed rays. Thus, for example, the maximum thickness line 50bt along the top surface of the shield 44b, and the maximum thickness line 50cb along the bottom surface of the shield 44c are vertically coincident with each other and with the line 42b, Fig. 7, defined by the crossed rays reflected from the paraboloidal reflecting area 32b.

It will thus be seen that each shield (and also the inner surfaces of the casing 10) is shaped from its inner end to its point of maximum thickness so that its upper surface lies immediately below the horizontal rays projected from the paraboloidal reflecting area immediately above the shield, and so that its lower surface lies just above the rays of maximum declination reflected from the reflecting area immediately below the shield. Due to the fact that the shields extend beyond the crossing point for the rays, it will be seen that they must be of progressively reduced thickness toward their outer ends, beyond their maximum control point of ray intersection. These shield surfaces between the point of maximum thickness to the outer ends are shaped so that the upper surface for each shield lies just below the maximum declined rays from the reflecting area immediately above the shield (or preferably, as shown in Fig. 5, the upper shield surfaces may be tapered downwardly at a slightly greater angle to give greater clearance for useful stray rays); and so that each shield lower surface lies immediately above the parallel rays reflected from the reflecting area lying immediately below the shield.

In this manner it will be seen that the shields do not intercept any of the rays properly directed from the several paraboloidal reflecting areas. At the same time the shields are brought into immediate juxtaposition along the parabolic lines of ray intersection from the areas, so that only relatively narrow slits of light will be observed between the shields, even when the reflector is viewed from the angle of Fig. 11. These relatively narrow slits, while thus effectively passing all of the rays from the reflector, minimize glare regardless of how the projector may be viewed. Inasmuch as the shield surfaces extend generally longitudinally of the reflector axis, as shown, it will be seen that any splash rays inaccurately directed from the reflector surface due to the imperfections or irregularities therein, will in most instances be reflected back and forth between the shields so as to find their way outwardly between the shields at the maximum control point or slit. In this connection the shield surfaces between the maximum control point and the inner ends are preferably silver plated or otherwise provided with reflective surfacing, whereas the surfaces of the shields between the maximum control point and the outer ends are preferably rendered non-reflecting so as to minimize glare. As will be understood, the shields may be opaque or translucent, in accordance with the requirements of any particular installation.

In Figs. 13–17 various modified forms of shields are shown. In Fig. 13 a structure is illustrated substantially similar to that hereinbefore described in reference to Figs. 1–12, except that the lower point of maximum shield thickness, for example, as indicated at 150cb, corresponding to the point 50cb previously discussed, lies slightly forwardly of the line of ray intersection 140b; whereas the cooperative upper point of maximum thickness for the lower shield lies slightly rearwardly of the line of ray intersection as indicated at 150bt. By this means the slits between the several shields along their points of maximum control may be rendered somewhat more completely screened, while still providing a minimum of interference with the projected rays of the reflector.

In Fig. 15 an embodiment is illustrated, also generally similar to the embodiment of Figs. 1–12, except that the shield surfaces are cut away so as to provide a greater spacing between the shields except at the point of maximum control.

In Fig. 16 an embodiment is illustrated substantially similar to Fig. 15 except that the maximum control points of the shields, as indicated for example at 350cb and 350bt, are offset, respectively, forwardly and rearwardly of the ray intersection 340b, incorporating the principles heretofore discussed in reference to Fig. 13.

In Fig. 17 an embodiment is illustrated substantially similar to Fig. 15 except that the shields are cut away inwardly of their point of maximum control.

In Fig. 14 an embodiment is illustrated generally similar to Fig. 16 except that the shields as indicated at 544b, 544c and 544d are in this instance in the form of shaped sheets or plates disposed at the point of maximum control, as shown, the shields being omitted except at such point, whereby to provide a structure of reduced cost.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A light projector comprising a generally conical reflector, said reflector having a plurality of reflecting areas extending transversely across the reflector, each area being concavely curved to reflect a band of cross rayed light from a light source, and a plurality of shields disposed between said bands, said shields having curved surfaces extended longitudinally of the reflector axis and said shields having portions of greater thickness and portions of lesser thickness at predetermined longitudinally spaced points, the greater thickness portions of the shields defining curved lines extending transversely of the shields.

2. A light projector comprising a generally conical reflector, said reflector having a plurality of reflecting areas extending transversely across the reflector, each area being concavely curved to reflect a band of cross rayed light from a light source, and a plurality of shields disposed between said bands, said shields being disposed in juxtaposition to each other along curved lines substantially coincident with the lines defined by the crossing rays from the reflecting areas.

3. A light projector comprising a generally conical reflector, said reflector having a plurality of reflecting areas extending transversely across the reflector, each area being concavely curved to reflect a band of cross rayed light from a light source, and a plurality of shields disposed between said bands, said shields being extended longitudinally of the reflector axis and being in closest proximity to each other along the lines defined by the crossing rays from said reflecting areas.

4. A light projector as defined in claim 2, wherein said shields comprise a plurality of members extending laterally across the projector substantially along the lines defined by the crossing rays.

5. A light projector as defined in claim 2, wherein said shields comprise a plurality of members extending laterally across the projector along the lines defined by the crossing rays, said members being provided with portions extending from said lines longitudinally of the reflector axis.

6. A light projector comprising a generally conical reflector, said reflector having a plurality of reflecting areas extending transversely across the reflector, each area being concavely curved to reflect a band of cross rayed light from a light source, said areas being shaped to effect the convergence of the rays from each of the areas along a substantially parabolic line, and a plurality of shields disposed between said bands, said shields being extended longitudinally of the reflector axis and having portions of greater thickness and portions of lesser thickness at predetermined longitudinally spaced points, the greater thickness portions of the shields defining curved lines extending transversely of the shields.

7. A light projector comprising a generally conical reflector, said reflector having a plurality of reflecting areas extending transversely across the reflector, each area being concavely curved to reflect a band of cross rayed light from a light source, said areas being shaped to effect the convergence of the rays from each of the areas along a substantially parabolic line, and a plurality of shields disposed between said bands, said shields being disposed in juxtaposition to each other along parabolic lines substantially coincident with the lines defined by the convergence of the rays.

8. A light projector comprising a generally conical reflector, said reflector having a plurality of reflecting areas extending transversely across the reflector, each area being concavely curved to reflect a band of cross rayed light from a light source, said areas being shaped to effect the convergence of the rays from each of the areas along a substantially parabolic line, and a plurality of shields disposed between said bands, said shields being extended longitudinally of the reflector axis and being in closest proximity to each other along the parabolic lines defined by the convergence of the rays.

9. A light projector as defined in claim 7, wherein said shields comprise a plurality of members extending laterally across the projector substantially along the lines defined by the convergence of the rays.

10. A light projector as defined in claim 7, wherein said shields comprise a plurality of members extending laterally across the projector along the lines defined by the convergence of the rays, said shields being provided with portions extending from said lines longitudinally of the reflector axis.

11. A light projector comprising a generally conical reflector, said reflector having a plurality of reflecting areas extending transversely across the reflector, each area being concavely curved to reflect a band of cross rayed light from a light source, and a plurality of shields disposed between said bands, said shields providing relatively narrow slits therebetween along curved lines substantially coincident with the lines defined by the crossing rays from the reflecting areas.

12. A light projector comprising a generally conical reflector, said reflector having a plurality of reflecting areas extending transversely across the reflector, each area being concavely curved to reflect a band of cross rayed light from a light source, said areas being shaped to effect the convergence of the rays from each of the areas along a substantially parabolic line, and a plurality of shields disposed between said bands, said shields providing relatively narrow slits therebetween along parabolic lines substantially coincident with the lines defined by the convergence of the rays.

13. A light projector comprising a generally conical reflector, said reflector having a plurality of reflecting areas extending transversely across the reflector, each area being concavely curved to reflect a band of cross rayed light from a light source, and a plurality of elongated shields disposed between said bands, each of said shields having a point of maximum thickness intermediate the length thereof and being of decreasing thickness in a direction extending toward each end of the shield from said intermediate point, said points of maximum thickness defining relatively narrow slits between the shields substantially coincident with the lines defined by the crossing rays from the reflecting areas.

14. A light projector comprising a generally conical reflector, said reflector having a plurality of reflecting areas extending transversely across the reflector, each area being concavely curved to reflect a band of cross rayed light from a light source, said areas being shaped to effect the convergence of the rays from each of the areas along a substantially parabolic line, and a plurality of elongated shields disposed between said bands, each of said shields having a point of maximum thickness intermediate the length thereof and being of decreasing thickness in a direction extending toward each end of the shield from said intermediate point, said points of maximum thickness defining relatively narrow slits between the shields substantially coincident with the parabolic lines defined by the convergence of the rays.

JOHN G. WHITING.

REFERENCES CITED

The following references are of record in the file of this patent:

UNITED STATES PATENTS

| Number | Name | Date |
|---|---|---|
| 1,521,833 | Paul | Jan. 6, 1925 |
| 1,607,394 | Fauver | Nov. 16, 1926 |
| 2,102,928 | Van Leunen | Dec. 21, 1937 |
| 2,213,880 | Geroud | Sept. 3, 1940 |
| 2,415,120 | Whiting | Feb. 4, 1947 |